US011792246B2

(12) United States Patent
Myers

(10) Patent No.: US 11,792,246 B2
(45) Date of Patent: Oct. 17, 2023

(54) SYSTEM AND METHOD FOR COORDINATING LIVE ACTING PERFORMANCES AT VENUES

(71) Applicant: Inner-City Movement, Inc., Upper Darby, PA (US)

(72) Inventor: Benjamin David Myers, Upper Darby, PA (US)

(73) Assignee: INNER-CITY MOVEMENT, INC., Upper Darby, PA (US)

(*) Notice: Subject to any disclaimer, the term of this patent is extended or adjusted under 35 U.S.C. 154(b) by 0 days.

(21) Appl. No.: 16/661,843

(22) Filed: Oct. 23, 2019

(65) Prior Publication Data
US 2021/0126957 A1 Apr. 29, 2021

(51) Int. Cl.
| *H04L 65/611* | (2022.01) |
| *H04L 65/1063* | (2022.01) |
| *A63J 5/02* | (2006.01) |
| *A63J 5/04* | (2006.01) |

(52) U.S. Cl.
CPC ............... *H04L 65/611* (2022.05); *A63J 5/02* (2013.01); *H04L 65/1063* (2013.01); *A63J 5/025* (2013.01); *A63J 5/04* (2013.01)

(58) Field of Classification Search
CPC ..................... H04L 65/4076; H04L 65/1063
USPC .......................................................... 709/219
See application file for complete search history.

(56) References Cited

U.S. PATENT DOCUMENTS

| 5,801,685 A * | 9/1998 | Miller ................... G11B 27/034 715/202 |
| 7,747,434 B2 * | 6/2010 | Flanagan ................. G06F 40/58 704/235 |
| 2010/0027961 A1 * | 2/2010 | Gentile ................... H04N 5/272 386/278 |
| 2012/0081530 A1 * | 4/2012 | Kerr ...................... G11B 27/034 348/61 |
| 2015/0356090 A1 * | 12/2015 | Birnbaum ......... G06F 16/24578 707/723 |
| 2016/0117838 A1 * | 4/2016 | Rackham ............... G06V 20/41 382/103 |
| 2016/0173738 A1 * | 6/2016 | Jones ................... H04N 5/2228 715/719 |
| 2016/0364087 A1 * | 12/2016 | Thompson ............ G06F 3/0481 |

\* cited by examiner

*Primary Examiner* — Mohamed A. Wasel
*Assistant Examiner* — John Fan
(74) *Attorney, Agent, or Firm* — Cabello Hall Zinda, PLLC

(57) ABSTRACT

Live performances are coordinated at venues using a host (server) and client (user devices). Scripts for live performances are stored at the host. Each script has roles for playing by users (actors) and has teleprompter text for delivery at a sequence in the live performances. Media elements are associated at the host in the sequence of the teleprompter text for output in the live performances. Once a lobby is created for a live performance at a venue, clients are associated at the host with the roles for the script. The host delivers the teleprompter text for output in real time at the sequence during the live performance with the clients at the venue, and the host delivers the associated media elements for output in the sequence during the live performance at the venue. Each venue can have an associated configuration for media output so the host can deliver the media elements according to the configuration.

22 Claims, 5 Drawing Sheets

SYSTEM AND METHOD FOR COORDINATING LIVE ACTING PERFORMANCES AT VENUES

BACKGROUND OF THE DISCLOSURE

Live performances combine video, lighting, audio, special effects, teleprompters, and other audio/visual elements together. Typically, several operators are needed to coordinate all of these different elements during the live performance. For example, a stage manager follows along in the script as the actors deliver their lines. The stage manager then calls out the upcoming cues in the performance so the operators on stand-by can execute the visual, sound, lighting, and other elements at the right times. Currently, directors have to mark up the book (script) with all of these cues and then transfer them to multiple spreadsheets for stage managers to call out during the performance. Each of the different elements use a different system and controls. Coordinating all of them in proper time and place during the performance is even a challenge when professional actors and professional stage personnel are used.

As will be appreciated, acting can be a powerful way to communicate with audiences even when non-professional actors are used. When non-professional actors (and even audience volunteers and children) perform the acting, the experience can be particularly poignant for the actors and members in the audience. Moreover, portraying people and events from the Bible can be an important learning experience for children, and youth ministers are continually striving to find new ways to teach children about Biblical messages.

In the past, video files used in live performances have a standard time code based on the Society of Television and Motion Picture Engineers (SMPTE). Visuals, lights, special effects, teleprompters, and the like can be synced to the standard SMPTE time code, but the performance requires separate systems and applications that each listen to the SMPTE time code and execute their respective elements.

At any point in a live performance, however, circumstances may change, and the timing and placement of elements in the performance may be affected. This can be especially true when non-professional actors, and even children, are delivering lines and acting in the live performance. Therefore, what is needed is a more flexible system that can accommodate unpredictable changes in the line delivery and execution of a live performance and that can allow operators and even audience members to be actors in the performance.

The subject matter of the present disclosure is directed to overcoming, or at least reducing the effects of, one or more of the problems set forth above.

SUMMARY OF THE DISCLOSURE

A method according to the present disclosure is directed to coordinating a live performance by one or more actors at a venue. A script for the live performance is stored at a host. The script has one or more roles for playing by the one or more actors, and the script has teleprompter text for delivery by the one or more actors at a sequence in the live performance. At the host, one or more media elements are associated in the sequence of the teleprompter text for output in the live performance. Also at the host, one or more clients at the venue are associated with the one or more roles of the script.

From the host, the teleprompter text is delivered for output in real time at the sequence during the live performance at the one or more clients, and the one or more associated media elements are delivered for output in real time at the sequence during the live performance. The teleprompter text can further be delivered from the host to at least one visual output device at the venue for output.

The host can comprise a server, a server system, a web-based server, or a remote server. The clients can comprise one or more of a local server, a computer, a laptop, a tablet computer, a smartphone, and a handheld device. The media elements can include one or more of a song, a karaoke song, music, a video, an image, a sound effect, a smoke effect, and a lighting effect.

To store the script at the host, the script can be stored with a host application running on a server accessible by the one or more clients via a network interface, and one or more user interfaces can be provided at the host to create the script. In the method, one or more client applications can be delivered from a server of the host to one or more client devices for the one or more clients.

To then associate the one or more clients with the one or more roles of the script at the host, a link can be created for the live performance and can be shared for access by the one or more clients. To associate the one or more clients at the venue with the one or more roles, the one or more clients can then be assigned to the one or more roles using the host, or the one or more roles can be selected by the one or more clients.

To deliver the teleprompter text from the host, the teleprompter text can be sent from the host to the one or more clients, and the teleprompter text can be output with a client application running on the one or more clients. Then, according to the method, a pace for the output of the teleprompter text at the one or more clients at the sequence can be controlled by at least one of the one or more clients during the live performance.

To deliver the associated media elements from the host, the associated media elements can be sent from the host to at least one client application running on at least one client device, and the associated media elements can then be output with one or more interfaces of the at least one client application to one or more media output devices at the venue. The one or more media output devices can comprise one or more of audio equipment, video equipment, one or more displays, one or more projectors, smoke machine, and lighting equipment.

In delivering the associated media elements from the host, the associated media elements can be delivered from the host directly to one or more media output devices at the venue. Alternatively, the associated media elements can be delivered from the host to one of the one or more clients having one or more media outputs, which are able to output the media elements and/or are connected to other media. For example, the associate media elements can be output in real time at the sequence with the one client, or the associated media elements can be delivered in real time at the sequence from the one client to one or more media output devices.

To deliver content (i.e., the teleprompter text and/or the one or more associated media elements) from the host for output in real time at the sequence during the live performance, the content can be streamed or broadcast from the host and can be buffered at at least one of the clients for output by the at least one client in real time at the venue, or the content can be streamed or broadcast from the host and can be buffered at at least one media output device at the venue for output by the at least one media output device in real time at the venue. Likewise, the content can be downloaded in whole or in part from the host on at least one of the clients so a pace for the output of the content in real time by the at least one client can be controlled with host, or the content can be downloaded in whole or in part from the host on at least one media output device at the venue so a pace for the output of the content in real time by the at least one media output device can be controlled with the host.

A method according to the present disclosure is directed to coordinating live performances of actors at venues. One or more scripts for the live performances are stored at a host. The one or more scripts have roles for playing by the actors. Each of the one or more scripts has teleprompter text for delivery by the actors at a sequence in each of the live performances. One or more media elements are associated at the host in the sequence of the teleprompter text for output in each of the live performances of each of the one or more scripts. Clients with the roles for each of the one or more scripts in each of the live performances at each of the venues are associated at the host. The teleprompter text is delivered from the host for output in real time at the sequence during each of the live performances at the clients at each of the venues. The one or more associated media elements are delivered from the host for output in real time at the sequence during each of the live performances at each of the venues.

In the method, a configuration for media output at each of the venues can be associate at the host. The one or more associated media elements can be delivered from the host according to the associated configuration of the media output at each of the venues.

According to the present disclosure, a non-transitory program storage device comprises instructions stored thereon to cause one or more processors of a host to perform a method as disclosed above. For example, the one or more processors of a host can: store a script for the live performance, the script having roles for playing by the actors, the script having teleprompter text for delivery by the actors at a sequence in the live performance; associate a plurality of media elements in the sequence of the teleprompter text for output in the live performance; associate a plurality of clients with the roles of the script; deliver the teleprompter text from the host for output in real time at the sequence during the live performance at the clients; and deliver the associated media elements from the host for output in real time at the sequence during the live performance.

According to the present disclosure, a host device is used for coordinating a live performance between a plurality of networked client devices of actors at a venue. The host device comprises memory, one or more interfaces, and one or more processors. The memory stores a script for the live performance. The script has roles for playing by the actors. The script has teleprompter text for delivery by the actors at a sequence in the live performance. The script also has a plurality of media elements associated in the sequence of the teleprompter text for output in the live performance.

The one or more interfaces are for communication with the networked client devices, and the one or more processors are in communication with the memory and the one or more interfaces. The one or more processors are configured to: associate a plurality of the network client devices with the roles of the script; deliver the teleprompter text from the host device for output in real time at the sequence during the live performance with the client devices; and deliver the associated media elements from the host device for output in real time at the sequence during the live performance.

The foregoing summary is not intended to summarize each potential embodiment or every aspect of the present disclosure.

DETAILED DESCRIPTION OF THE DISCLOSURE

Figure 1A:
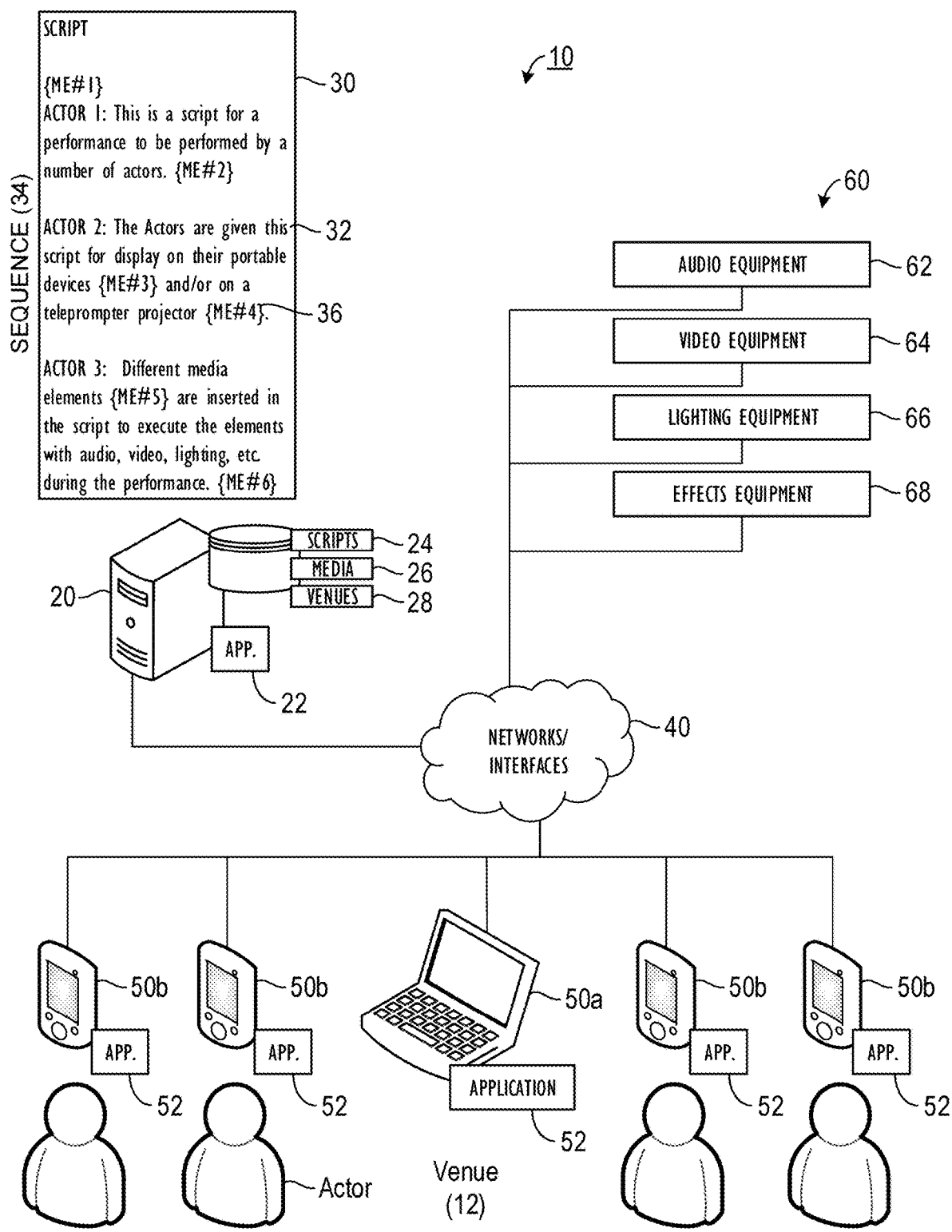
FIG. 1A illustrates a system according to the present disclosure for coordinating a live performance between a plurality of actors at a venue.

FIG. 1A illustrates a system 10 according to the present disclosure for coordinating a live performance at a venue 12. The system 10 is flexible so it can accommodate unpredictable changes in the line delivery and execution of the live performance by the actors. Additionally, the system 10 is automated so it can allow operators and even audience members to be the actors in the live performance.

The system 10 includes a first computing device or host device 20 and a number of second computing devices or client devices 50a-b for use by the actors at the venue 12. The system 10 may also include media equipment 60 for use at the venue 12. These components 20, 50a-b, and 60 are networked together by connecting over one or more suitable networks/interfaces 40. Accordingly, the system 10 in general includes one or more media interfaces 40 in communication with one or more of the components 50a-b, 60 and includes one or more network interfaces 40 in communication with networked components 20 and 50a-b, most of which can at least include a processor, memory, and input/output devices.

The venue 12 can be a theater, a church, a home, or any indoor or outdoor location. In general, the host device 20 may be a computer or the like located at the venue 12 and configured as disclosed herein. Alternatively, the host device 20 can be a server or server system located remotely from the venue 12, while the client devices 50a-b can be local user devices associated with the actors at the venue. These client devices 50a-b can be a computer, a laptop, a smartphone, a tablet, a handheld device, or other like user device.

In one operational arrangement, the host device 20 is a remote server, and each of the local client devices 50a-b can be a portable device, such as a smartphone, with one of the client devices 50a being designated as a master or director device. Each of the local client devices 50a-b at the venue 12 can connect on their own to the host server 20 via the one or more networks/interfaces 40. Alternatively, the director device 50a may provide the communication interface between the other client devices 50b and the host server 20, but this may not be preferred.

External media equipment 60 may not be present at the venue 12 in this arrangement. Instead, the displays and/or loudspeakers of one or more of the client devices 50a-b can be used for the multimedia output. Alternatively, external media equipment 60 may be present at the venue 12, but none of the client devices 50a-b may not have the appropriate operational interface with the external media equipment 60. In this case, the host server 20 may interface and control the media equipment 60 at the venue 12.

In another operational arrangement, the host device 20 is a remote server, and each of the client devices 50a-b can be a user device (e.g., a computer, a laptop, a smartphone, etc.) One of the client devices 50a designated as the master or director device has operational interfaces for the external media equipment 60 at the venue 12. This director device 50a can then interface and control the media equipment 60 at the venue 12 during the performance. Meanwhile, the other client devices 50b may have limited output capabilities, such as mainly displaying teleprompter text for the actors.

Depending on the operational arrangement, the one or more interfaces 40 can include an audio interface, a video interface, an output interface, and an input interface. The one or more networks 40 may take any form including, but not limited to, a local area network (LAN), a wide area network (WAN), such as the Internet, or a combination of local and wide area networks. Moreover, the one or more networks 40 may use any desired technology, or combination of technologies (including, but not limited to, wired, wireless, cellular, or a combination thereof) and protocol (e.g., transmission control protocol, TCP).

The media equipment 60 available at the venue 12 can vary from one venue to another and may have more or less sophistication. In general, the media equipment 60 can include one or more of audio equipment 62, video equipment 64 (one or more displays, one or more projectors, etc.), lighting equipment 66 (e.g., DMX controller, lights, etc.), and effects equipment 68 (e.g., smoke machine, seating actuators, odor misting devices, etc.).

The host server 20 as a host device runs a host application or interface 22 for conducting live performances at the venue 12. The host sever 20 includes databases or libraries, including a script library 24, a media library 26, and a venue library 28. Any given script stored in the script library 24 can include any division of scenes, acts, roles, and the like.

As an example, a portion of one such script 30 is schematically illustrated in FIG. 1A. The script 30 includes teleprompter text 32 arranged with the narration and speaking roles for the actors in the live performance. The teleprompter text 32 of the script 30 is laid out in a sequence or timeline 34 for its delivery. Media elements 36 are associated in the script 30 for output within the sequence of the teleprompter text 32. The media elements 36 associated with the script 30 can include one or more of a karaoke song, music, a video, an image, a sound effect, smoke, lighting, etc. As noted in the background of the present disclosure, directors have had to mark up the book (script) with all of the cues and then transfer the cues to multiple spreadsheets for stage managers to call out. The system 30 of the present disclosure allows the director to associate sound, lighting, visuals, special effects, etc. directly into the script, as the director pre-plans the performance, conducts rehearsals, etc.

To coordinate a live performance between a plurality of actors, the script 30 for the live performance is stored at the host application 22 running on the host sever 20. In turn, the host server 20 delivers or outputs the teleprompter text 32 and media elements 36 at the sequence 34 from the host application 22 to at least one client device 50a-b and/or media equipment 60 for output during the live performance. This delivery and output during the live performance can be "in real time," meaning the teleprompter text 32 and the media elements 36 are delivered and output at the sequence 34 at the venue 12 in a way that is "live", at the pace of the actors, controlled by the speed of the teleprompter text 32, and/or driven by the director using user controls disclosed below.

For example, client applications 52 running on the client devices 50a-b are associated at the host application 22 with the roles of the script 30. The host server 20 delivers or outputs the teleprompter text 32 at the sequence 34 from the host application 22 to the client applications 52 for output in real time during the live performance. The host server 20 also delivers or outputs the associated media elements 36 within the sequence 34 from the host application 22 to one or more media devices 60 for output in real time during the live performance.

To output the teleprompter text 32, the teleprompter text 32 can be sent at the sequence 34 from the host application 22 to the client applications 52. In turn, the client devices 50a-b running the client applications 52 can output the teleprompter text 32 for the actors. Broadcasting or streaming of the text 32 from the host application 22 and buffering of the text 32 at the client applications 52 may be used in the delivery and output of the teleprompter text 32 for output in real time. Alternatively, the teleprompter text 32 can be downloaded in whole or in part on the client applications 52 from the host application 22, and the host application 22 can then control or trigger the pace of the real-time output of the text 52 by the client applications 52. As discussed below, at least the application (52) on the director's device (e.g., 50a) may have user controls for setting and pausing the pace.

To output the associated media elements 36, the host application 22 can send the associated media elements 36 to at least one of the client applications 52 running on at least one local device (e.g., 50a). In turn, the associated media elements 36 can be output to the one or more media equipment 60 using one or more interfaces 40 of the at least one client device (e.g., director device 50a) to the media equipment 60. This director device 50a can include a computer, a laptop, a smartphone, a tablet, a handheld device, or the like having appropriate interfaces 40 with the media equipment 60 at the venue 12. Alternatively, to output the associated media elements 36, the host application 22 can send the associated media elements 36 directly to the one or more media equipment 60, depending on the capabilities of the client devices 50a-b.

Broadcasting or streaming of the media elements 36 from the host application 22 and buffering of the media elements 36 at the venue's components (e.g., 50a-b, 60) may be used in the delivery and output of the media elements 36 for output in real time. Alternatively, the media elements 36 can be downloaded in whole or in part on the venue's components (e.g., 50a-b, 60) from the host application 22, and the host application 22 can then control or trigger the pace of the real-time output of the elements 52 by the venue's components (e.g., 50a-b, 60). As discussed below, at least the host application (52) on the director's device (e.g., 50a) may have user controls for setting and pausing the pace.

As noted above, the host or first computing device 20 can be a server or server system remote from the venue 12 having the local client devices 50a-b. This configuration allows the host server 20 to interface with multiple venues 12 across various locations to provide live performances. Therefore, the system 10 is not restricted to just one venue 12 as depicted in FIG. 1A, but can be extended to multiple venues with different arrangements of local client devices 50a-b, media equipment 60, and network/interfaces 40.

Figure 1B:
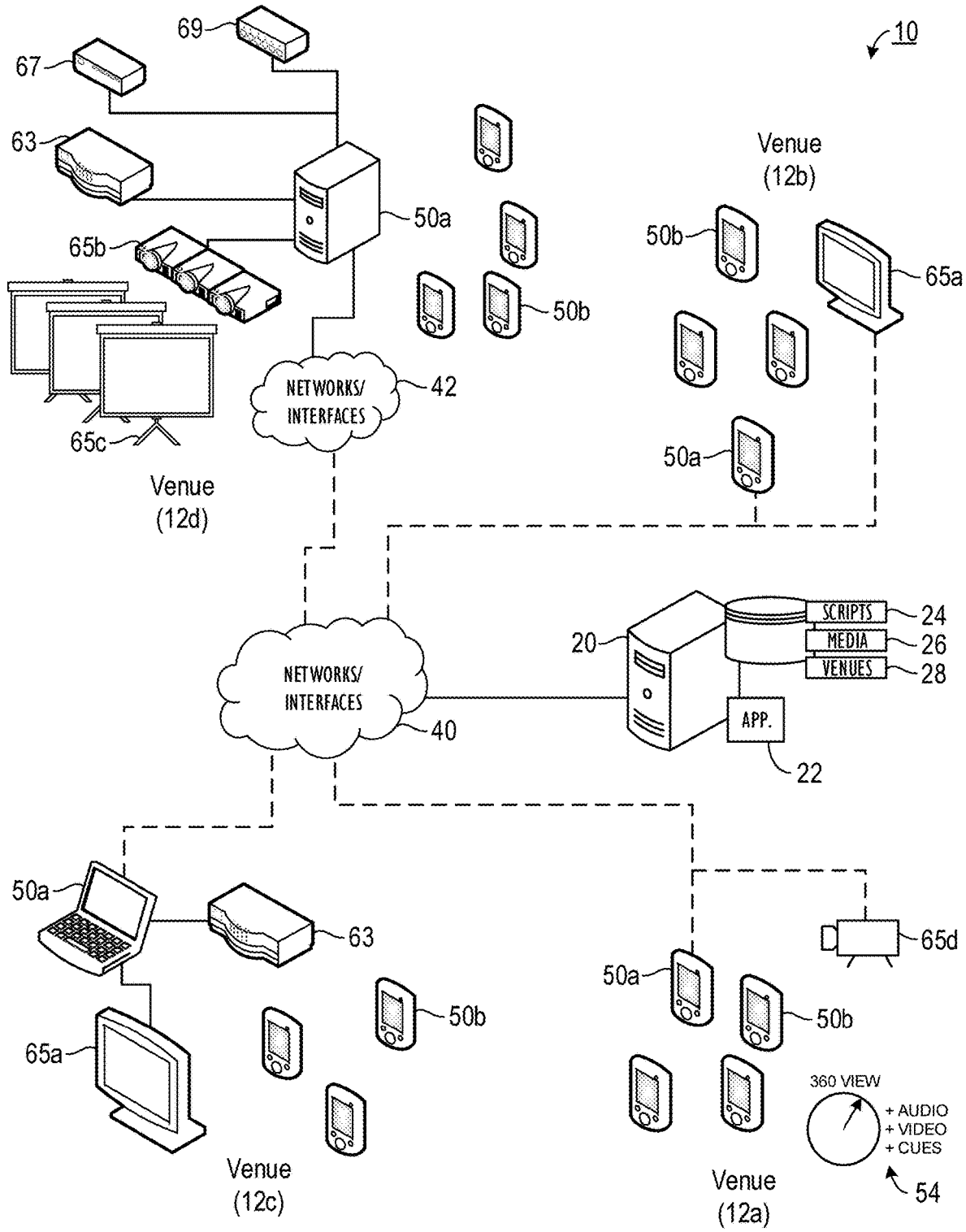
FIG. 1B illustrates the system according to the present disclosure for coordinating live performances between a plurality of venues.

For example, FIG. 1B illustrates the system 10 according to the present disclosure for coordinating live performances between a plurality of venues 12a-b. In this example, four venues 12a-d are shown, ranging from less sophisticated (e.g., 12a) to more sophisticated (e.g., 12d). The host device 20, which includes a host server system, application interfaces 22, and libraries 24-28, connects to the network/interfaces 40, such as the Internet. Users at each venue 12a-d can access accounts on the host 20, create scripts, load media, access scripts, configure venues, and the like to coordinate and conduct live performances.

At the first example venue 12a, a client device 50a of a director conducts a live performance with other client devices 50b participating. External media equipment is not available at this venue 12a so one or more of the client devices 50a-b may output audio, video, and cues. The director can connect his/her client device 50a to the host server system 20 through a network connection (e.g., cellular, Internet, etc.) via the network 40 and can access an account on the host application 22 to create a lobby. The actors can connect their client devices 50b to the host server system 20 through a network connection (e.g., cellular, Internet, etc.) via the network 40 and can access the created lobby on the host application 22. If viable, the actors' client devices 50b could access the live performance via a local connection (e.g., wired connection, wireless connection, Bluetooth, LAN, etc.) with the director's client device 50a.

The second example venue 12b is similarly configured as the first venue 12a and can be arranged similarly with a client device 50a of a director and client devices 50b of actors. However, external media equipment is available at this venue. In particular, video equipment in the form of a display or smart television 65a is available at the venue 12b. Because the client devices 50a-b may not have an appropriate interface to output audio and video to external media equipment, this smart televisions 65a can connect independently through a network connection (e.g., cellular, Internet, etc.) via the network 40 to the host server system 20 to receive teleprompter text, audio, media, and the like. As before, the director can connect his/her client device 50a to the host server system 20 through a network connection (e.g., cellular, Internet, etc.) via the network 40, and the actors can connect their client devices 50b to the host server system 20 through a network connection (e.g., cellular, Internet, etc.) via the network 40 or can access the live performance via a local connection (e.g., wired connection, wireless connection, Bluetooth, LAN, etc.) with the director's client device 50a.

The third example venue 12c includes external media equipment, such as a video display 65a and a sound system 63. One of the available client devices, such as the director's device 50a, may actually have appropriate interfaces to output audio and video to this external media equipment. Therefore, the video display 65a and sound system 63 can connect to the director's client device 50a via a local connection (e.g., wired connection, wireless connection, Bluetooth, LAN, etc.). As before, the director can connect his/her client device 50a to the host server system 20 through a network connection (e.g., cellular, Internet, etc.), and the actors can connect their client devices 50b to the host server system 20 through a network connection (e.g., cellular, Internet, etc.) or can access the live performance via a local connection (e.g., wired connection, wireless connection, Bluetooth, LAN, etc.) with the director's client device 50a.

Finally, the fourth example venue 12d represents a more sophisticated configuration, having a local client device 50a, which can be a client server system having a local area network 42. The client server 50a interfaces with media equipment, such as multiple projectors 65b with screens 65c, a sound system 63, a lighting controller 67, and an effects system 69. As before, the director can connect the client server 50a to the host server system 20 through a network connection (e.g., cellular, Internet, etc.), and the actors can connect their client devices 50b to the host server system 20 through a network connection (e.g., cellular, Internet, etc.) or can access the live performance via a local connection (e.g., wired connection, wireless connection, Bluetooth, LAN, etc.) with the client server 50a.

One or more cameras 65d may be present at any of the venues (e.g., 12a) to capture video and audio of the live performance. This captured video and audio can be used for either output at the same venue 12a and/or can be used at any of the other venues 12b-12d. In this way, the host server 20 can coordinate interactive live performances between venues 12a-12d. For example, actors at one venue 12a can act in the live performance at another venue (e.g., 12b).

As these example venues 12a-d show, churches can use existing equipment 60 along with the client applications 52 to greatly enhance their live performances. With the church's computer (e.g., 50a) logged into the host server 20, a front LED screen 65a or front projector 65b can display a visual backdrop, and back screens 65a or back projectors 65b can be used for output of the teleprompter text. Actors can use their smartphones 50b for personal output of the teleprompter text. Additional screens, edge blending, and warping projectors 65b can also be configured in the system 10 for the venue 12a-d to provide more of 360-degree experience wrapping around the actors. The venue 12a-d can be configured for multiple projectors 65b to project on a number of walls, screens, or dome. The projections can be warped and edge blended. The venue 12a-d can be configured to connect to a sound system 63, displays 65a, projectors 65b, DMX lighting 67, smoke machines 69, and the like.

After a story is selected, and participants have picked their parts, the person playing the director presses play and controls the speed of the scrolling teleprompter text that appears on all participants web-based client devices 50b. If a secondary screen 65a, projector 65b, or multi-projector setup is connected along with other media equipment 63, 67, 69; 360-degrees visuals of the Holy Land locale, sounds, and other effects such as storms, armies invading, seas parting, and change in mood of music can execute right on cue. An interactive virtual world can be explored in HD quality with a built in navigation joystick of client applications (52).

Figure 2:
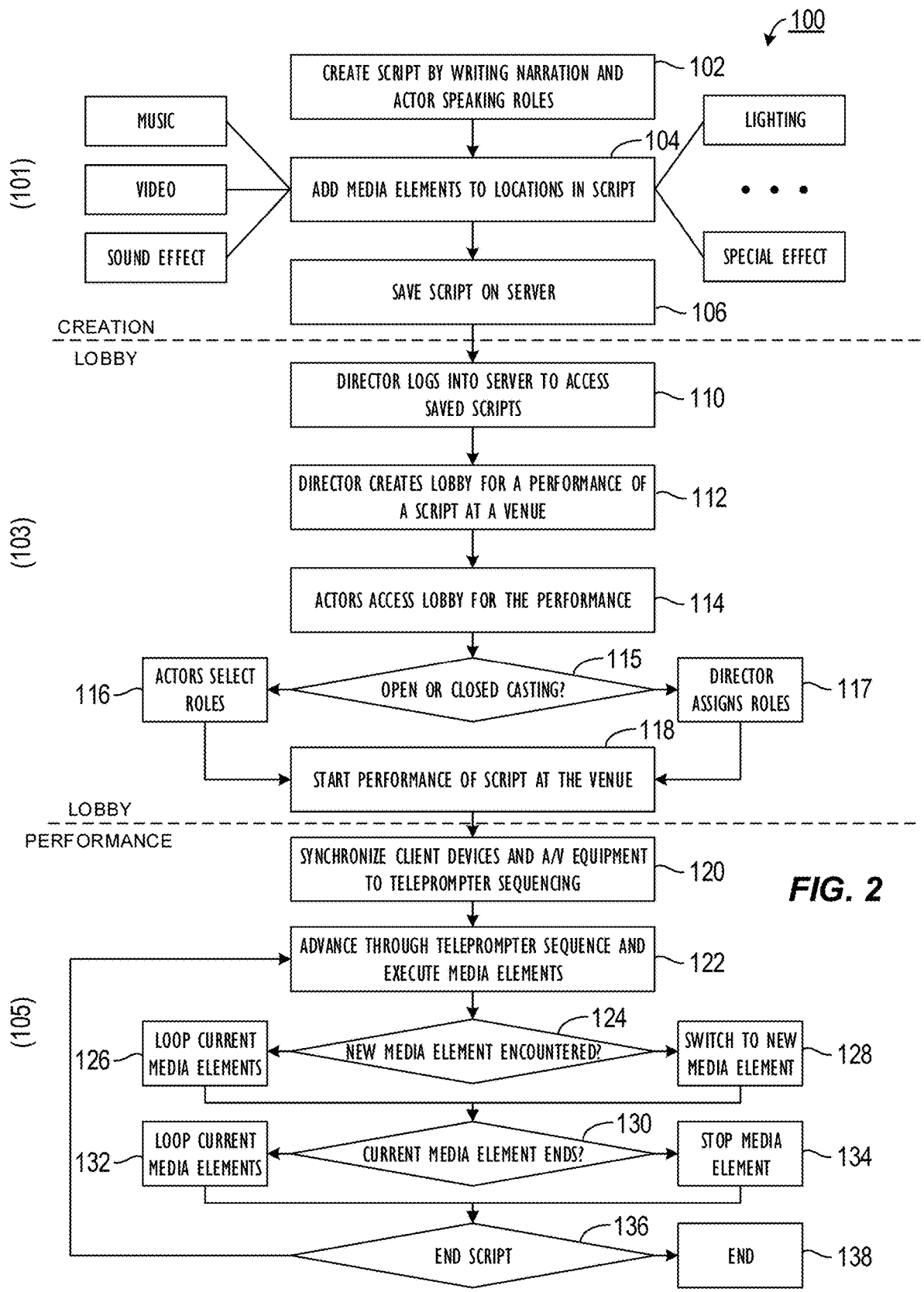
FIG. 2 illustrates a flowchart of a process according to the present disclosure for coordinating the live performance between the actors at the venue.

With an understanding of the system 10, discussion turns to FIG. 2, which illustrates a flowchart of a process 100 according to the present disclosure for coordinating a live performance. Reference is made to the elements in FIGS. 1A-1B for understanding.

In a creation stage (101) of the process 100, creators can create/compile a script 30 and make it available for use in live performances at venues. Briefly, the creator creates/compiles the script 30 in the host application 22 by writing the narration and actor speaking roles (Block 102). Other suitable directions, cues, and the like can be added as needed.

The creator also adds media elements 36 to locations in the sequence or timeline of the script 30 (Block 104). As noted herein, these media elements 36 can include songs, music, video, images, sound effects, lighting, special effects, etc. The host application 22 on the host server 20 may have access to the media library 26 of media elements 36 for incorporation into the script 30. Identifiers or call outs to the media elements 36 are added to the text 32 of the script 30 and can call out to the media elements 36 in the media library 26 of the host server 20 when triggered. With the script 30 created, the creator can save the script 30 on the host server 20, such as by saving the script 30 in the script library 24.

In one configuration, the host application 22 and client applications 52 can use a video game software engine, such as Unity's real-time 3D development platform available from Unity Technologies. A website of the host application 22 is used to control the software engine, and an application program interface (API) interfaces with the media library 24 holding the media elements 36. Using the host application 22, the creator can add media elements 36 to the script 30 by dropping identifiers or callouts to media elements onto the scripted words of the teleprompter text 32. In this way, when the word scrolls past the execution line on the teleprompter text during the live performance, the system 10 plays the media element (e.g., sound, visual, or lighting/special effect). The currently loaded media element continues executing for output in a loop until the system 10 reaches another indicated word in the teleprompter text 32. At that point, the system 10 ends the output of the current media element or switches to a newly designated media element. The change can be a timed crossfade. As a result, the system 10 provides a flexible, all-in-one media delivery system for conducting live performances.

Multiple scripts 30 can be created and saved in the script library 24 in this manner so actors at various venues 12 can access and perform a script 30 as desired. For example, the process 100 in FIG. 2 continues with a lobby stage (103) of the process 100 where actors can access and coordinate the roles for a performance. A director logs into the host server 20 to access saved scripts 30 in the script library 24 (Block 110). For example, the director may use the client application 52 on a client device (e.g., 50a) to connect to the host application 22 on the host sever 20 via the networks/interfaces 40 and select a desired script 30 from the script library 24 to be performed at the venue 12.

The director creates a lobby on the host server 20 for the selected script 30 from the library 24 (Block 112). The director may also select the venue 12 for the performance from a venue library 28. For example, the director may have preconfigured the arrangement of media equipment 60, interfaces 40, and the like at a particular venue, and the director can call up that configuration from the venue library 28. For example, the host application 22 can include mapping and edge blending tools for multiple projectors. The director can use these tools when setting up the configuration for a venue so backdrops, videos, images and the like can be projected during the performance on one or multiple screens, walls, a projection dome, etc.

With the lobby created, actors can access the lobby for the performance hosted on the host sever 20 (Block 114). The actors can access the lobby through the networks/interface 40 whether the actor is at the venue or not. Should the actor not have a client application (52) on his/her device (50b), the actor can download a copy of the client application (52) from the host server (20) to install and run on the client device (50b).

Casting for the performance may be either opened or closed as defined by the director (Decision 115). If open casting is available, the actors can select their roles in the performance from the available roles in the script 30 (Block 116). If casting is closed, the director assigns the actors to their roles in the performance (Block 117). The casting can be performed well in advance of the performance, or may be done right up to the time of the performance, such as when actors are selected from audience members.

With the roles assigned or selected, the director starts the performance of the script 30 at the venue 12 (Block 118). At this point, the process 100 moves to a performance stage (105). Overall, the system 10 is intended to operate in an automated fashion, outputting the teleprompter text 32 to client devices 50a-b, outputting the teleprompter text 32 to video equipment 64, outputting media elements 36 for delivery with the appropriate media equipment 60, and conducting the performance according to the sequence 34 without much need for manual direction or intervention.

In the performance stage (105), the system 10 synchronizes the client devices 50a-b and media equipment 60 to the sequence 34 of the teleprompter text 32 of the script 30 (Block 120). As the performance proceeds, the system 10 advances through the teleprompter sequence 34 and executes triggered media elements 36 (Block 122). To follow a natural pace of the particular performance, the venue 12, the actors, and the like, the system 10 loops currently triggered media elements 36 until triggered to stop or until triggered to switch to another media element 36. In this way, there is not a forced timing for the performance, and the actors can continue with the speaking roles while the media elements 36 execute at the pace of the teleprompter text 32.

As noted below, the pace of the sequence 34 can be manually controlled at the venue 12 by pausing, speeding up, and slowing down the rolling cursor sequencing through the teleprompter text 32. Ideally, the director of the performance can use his/her client device (50a) to adjust the pace. Then, as the sequence 34 of the teleprompter text 32 advances and encounters a media element 36 associated with the text 32, the media element 36 can be called out for execution. The media element 36 may not be stored locally on any of the client devices 50a-b and may not be downloaded with the teleprompter text 32, although this is possible. Instead, the media element 36 can be stored in the media library 26 of the host server 20. When the client device 50a triggers the callout for the media element 36 to the host server 20 as the sequence 34 of the teleprompter text 32 reaches the associated element 36, the media element 36 can then be delivered, downloaded, streamed, or the like to the venue 12 for output by whatever appropriate equipment has been configured for its output at the venue 12. Because the system 10 may be implemented at venues 12 of different sophistication and is preferably automated, streaming delivery of content (the teleprompter text 32, media elements 36, controls, equipment triggers, and the like) may be a preferred form of delivery for the live performance.

Therefore, as shown in the process 100, the system 10 can determine if a new media element 36 is encountered in the sequence 34 of the script 30 (Decision 124). If not, then the system 10 continues to loop the current media element 36 without any necessary time restriction (Block 126). If a new element 36 is encountered, then the system 10 can switch to outputting the new media element 36 (Block 128). For example, current background music may be looped for output during a portion of the script 30. When the sequence 34 of the script 30 reaches a new media element 36 for call out in the text 32, the background music is replaced by a song that is executed for output.

It is also possible that the system 10 can determine if a current media element 36 is triggered to end in the sequence 34 of the script 30 (Decision 130). If not, then the system 10 continues to loop the current media element 36 without any necessary time restriction (Block 132). If the media element 36 is to end, then the system 10 can stop outputting the media element 36 (Block 138). For example, current background music may be looped for output during a portion of the script 30. When the sequence 34 of the script 30 reaches a null trigger for call out in the text 32, output of the background music is stopped.

As noted, the media elements 36 are real-time deliverables, and multiple elements 36 can be layered in the script 30. Some media elements 36 may require specific treatment. For example, a media element 36 for a karaoke song may not include a looped execution. Instead, the karaoke song has a time code that synchronizes the lyrics to the music so the lyrics scroll or advance with the timing of the music. Once the media element 36 for the karaoke song is started, the teleprompter sequence 34 may be paused or suspended for the completion of the song. Preferably, the timed lyrics associated with the karaoke song are displayed across the bottom of the teleprompter display. Alternatively, the output of the teleprompter text 32 can be replaced by the timed lyrics associated with the karaoke song.

The performance continues advancing through the sequence 34 until the script 30 is ended (Decision 136), at which point the performance ends (Block 138).

As can be seen, the teleprompter text 32 can be loaded with all the call outs for media elements 36 incorporated into the words where the elements 36 are to execute. A stage manager calling the show or other operators are not required to execute the media elements 36, thereby eliminating user errors. In this way, the system 10 allows a small theatre group to run a show with very limited staff, as in many shows the staff may also play roles in the performance. In fact, the operators can be actors in the show and can run the show from their client devices 50*a-b* (e.g., smartphones).

Figure 3:
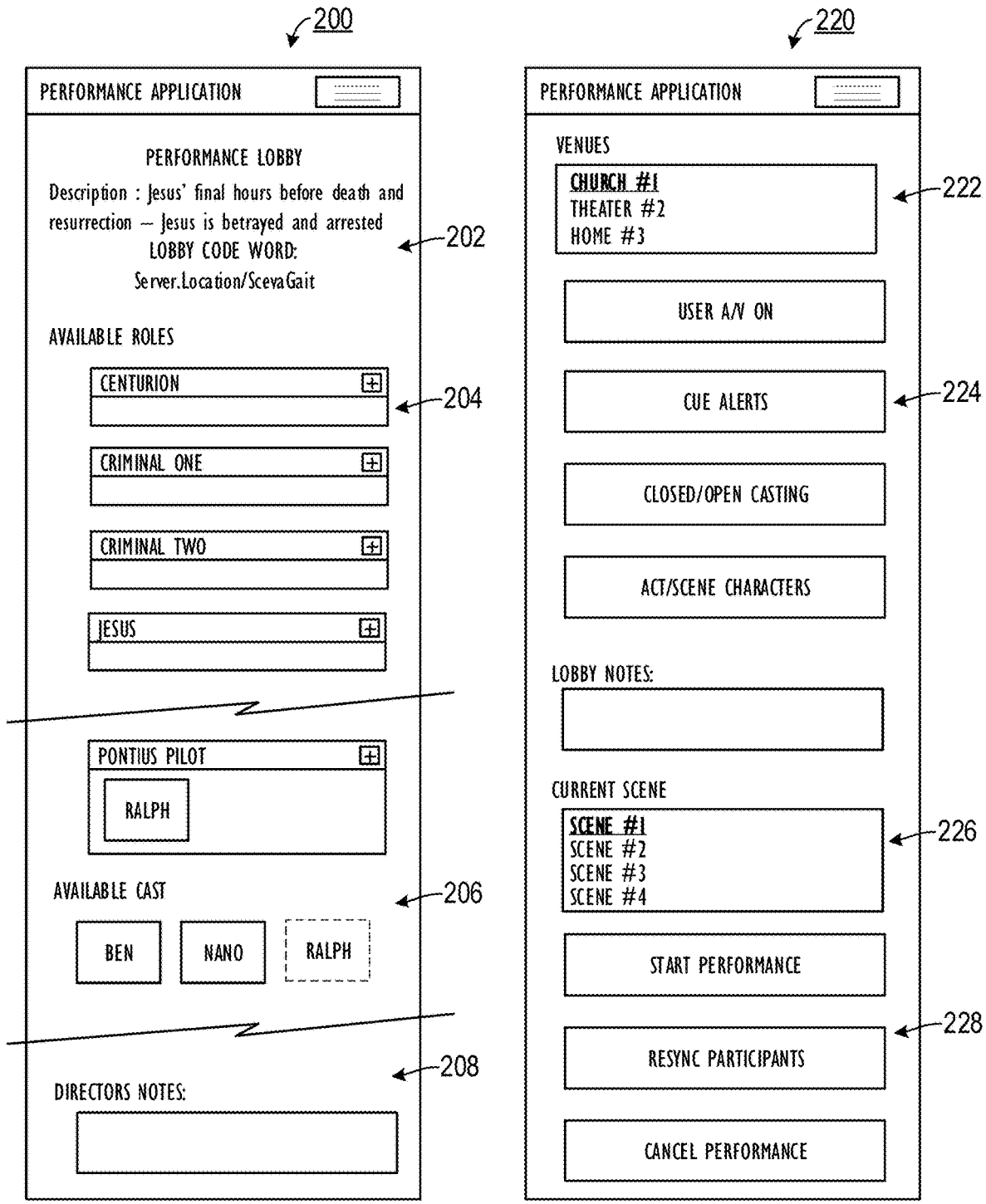
FIGS. 3A-3B illustrate screens of a client application for coordinating the live performance.

As noted above, a director can create a lobby for performance of a script 30 at a venue 12. For example, an actor/director having a client device 50*a-b*, such as a smartphone, tablet, or other device supporting a web browser, logs into a designated address of the host server 20. The director then chooses a performance and creates a lobby. FIGS. 3A-3B illustrate screens 200, 220 of a client application (52) for creating a lobby and coordinating the live performance.

The first screen 200 in FIG. 3A includes at 202 details of the lobby created by the director. In the screen 200, the performance lobby is described, and a code word, address, a Quick Response (QR) code, or other type of link is given for the lobby. In this example, the link is Server. Location/ ScevaGait. Other actors can join the lobby using the link in their client application (52).

The screen 200 at 204 shows a number of defined roles loaded into the director's client application (52) for the script (30). These are indicated as available or filled roles in the screen 200. At 206, available cast members are also listed and can correspond to those actors that have accessed the lobby. The director that started the lobby can assign roles by assigning the available cast to an available role using the screen 200, or individuals can choose their own roles to play.

At 208, a text box for any director's notes is provided so input information from the director can be shared with all of the client applications (52) connecting to the lobby.

The screen 220 in FIG. 3B shows additional controls and user interface elements for the director. At 222, venues (12) having preconfigured arrangement of media equipment (60) and the like are listed for selection by the director. A given venue (2) may have a client device (50*a*) running one or more specific software interfaces for controlling the media equipment (60). A given venue (12) may have a specific number of display, projectors, aspect ratios, blending between projected images, etc.

At 224, various buttons allow the director to control the live performance. One button allows the director to turn audio-visual capabilities on and off for other client applications (52). For example, the director's client device (50*a*) running the client application (52) may be interfacing with the media equipment (60). In this case, the director can turn off the audio-visual capabilities of the other users.

Another button can allow the director to turn cue alerts on and off for the client applications (52) on client devices (50). For example, each client application (52) for the client device (50*b*) of an actor may provide a cue to the actor that the actor's role, speaking, or instruction is approaching in the sequence (34) of the script (30). The cue can preferably be a vibration of the actor's device (50*b*), which can be a smartphone, and the cue can be given before the actor's speaking role comes up in the sequence (34) of the script (30). This can allow the actor to act out a given scene without needing to follow the script's text (32) until necessary. Yet another button can allow the director to make casting open or closed as noted above.

At 226, scene selections for the performance can be selected. As noted herein, a given performance may have a number of acts, scenes, or the like. A particular scene can be selected here from those available.

Finally at 228, controls are provided for the director to start the performance, re-synchronize the client applications (52) for the actors to any new updates, and to cancel the performance. As will be appreciated with the benefit of the present disclosure, these and other user interface elements and controls may be made available to the director for the live performance.

When all the actors are ready to go, the director hits start, and all the client applications 52 on the actor's devices 50*a-b* are launched into a synchronized teleprompter that guides the actor through the script (30). As noted above, actors can access the lobby of the live performance. Once the performance is started, the actors can then have the teleprompter text (32) (and possibly other elements of the script) output on the actor's client device 50*a-b*.

As shown in FIG. 1B, the client devices 50*a-b* can output various media elements 54, such as visual, audio, and cue elements. Visual elements can be output to appear as a digital backdrop on all devices 50*a-b*. For example, FIG. 1B shows a 360-view that can be available on client device 50*a-b*, such as a smartphone. As the actor points the smartphone in the venue 12*a*, the device 50*a-b* may use the orientation to show an appropriate section of the 360-view, thereby allowing the actor to look through the environment in real time.

Audio elements, such as music and sound effects, can be output on one or more of the client devices 50*a-b*. Additionally, the client devices 50*a-b* can output cues for the actors, such as vibration before the actor's speaking role comes up in the script's sequence.

Furthermore, as noted above, media elements (36) can be output for delivery using media equipment 60. This may be done in addition to or instead of any media elements (e.g., 54; FIG. 1B) output from the client devices 50*a-b*. To output the media through the equipment 60, a user can login to the host server 20 on a client device (e.g., 50*a*), which can be connected to a large screen or projector with a HDMI cord, to have the visuals output as a large digital backdrop to enhance the enactment. Should a client device 50*a* not be capable of output of the media or interface with the equipment 60, then the host server 20 may connect over the network/interface with the media equipment 60 directly to output the media elements (36).

Of all of the elements output during the performance, the teleprompter text (32) of the speaking roles is particularly important for the actors. The text (32) may be projected on a screen for all of the actors to see. Additionally or alternatively, the text (32) may be output on the actor's client device 50a-b, such as their smartphone. One of the client devices (e.g., the director's device 50a) may include particular controls for the director to conduct the live performance.

Figure 4:
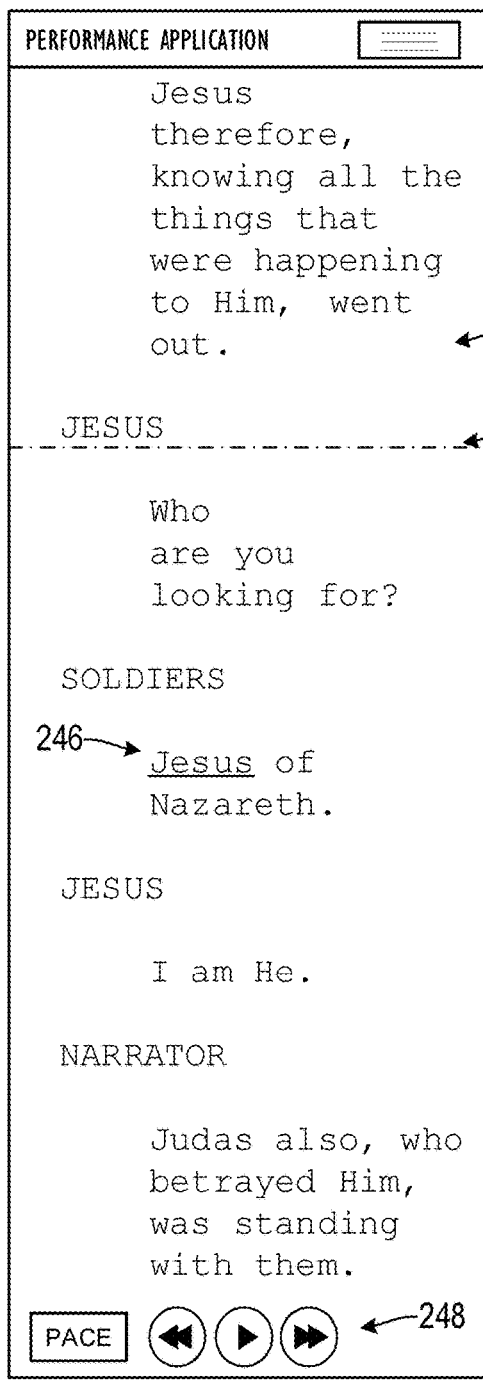
FIG. 4 illustrates another screen of a client application for conducting the live performance.

For example, FIG. 4 illustrates a screen 240 of a client application (52) for conducting the live performance. This screen 240 shows the teleprompter text 242 being output according to the sequence on the user interface of a client application (52). The scroll line 244 advances through the text 242 at a defined pace, and triggers are generated when media element triggers or call outs 246 are encountered in the text 242 of the script. For visualization, the trigger 246 may be identified as a different color, bolding, etc. for an associated word in the text 242 when the media element is triggered. This may be preferred so that any triggers or callouts 246 for media elements are not displayed to users or directors in a way that would interrupt or obscure the delivery of the teleprompter text 242. Preferably, trigger visualizations may only be visible on the director's view of the teleprompter text 242.

This particular screen 240 includes pacing controls 248, including a play/pause toggle, a speed-up button, and a slow-down button. The speed or pace of the sequence of the text 242 can optionally be displayed on the screen using an appropriate measure for the user to know the current pace. Preferably, such pacing controls 248 are only available only on the director's client application (52), but could be available on any one or more of the client applications (52) as desired. The pacing controls 248 allow the users (such as mainly the director) to adjust the pace of the sequence of the teleprompter text 242 to accommodate the actually delivery of the roles given by the actors.

Figure 5:
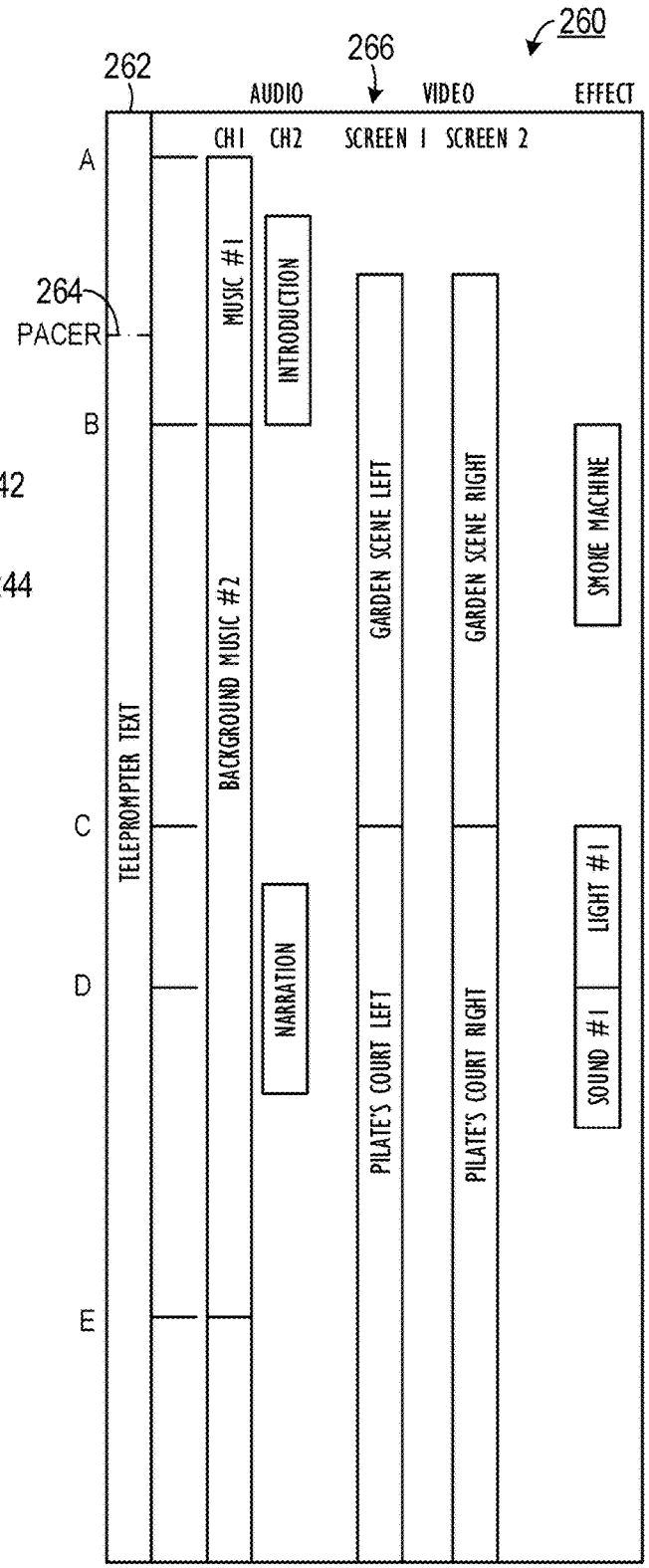
FIG. 5 illustrate a schematic of the coordinated elements of a live performance configured according to the present disclosure.

As noted herein, a script (30) according to the present disclosure includes teleprompter text (32) and media elements (36) incorporated together. FIG. 5 illustrate a schematic 260 of the coordinated elements of a live performance configured according to the present disclosure. The teleprompter text 262 of the script is laid out for sequenced deliver during the performance, with the pace being controlled by pacing controls (e.g., 248) noted herein. Media elements 266 are associated with locations in the sequence of the teleprompter text 262. For example, audio, video, and effect elements are shown associated with the teleprompter text 262. Multiple elements 266 can be layered as depicted.

In the present example, multiple audio channels, video channels, and effects can be triggered at different sequence locations in the teleprompter text 262. The scroll line or pacer 264 advances through the teleprompter text 262, and media elements 266 are triggered at points (e.g., A, B, C, D, E) as they come up in the sequence.

As noted, the system 10 preferably executes and loops the sounds and visuals at the speed of the actor who is delivering lines. Therefore, the media elements 266 loop until triggered to stop or switch. Accordingly, even though the music triggered at point A may only last for a given length, it will continue to play and loop even if the pacer 264 is paused or slowed down between points A and B for a time frame longer than the actual length of the music.

Preferably, at least the audio and visuals are looped. Some of the lighting effects can simply remain active until triggered to stop. Other effects may be best controlled in at least a timed fashion. For example, a smoke machine or sound effect may along have a short time of activation once triggered in the sequence.

According to the present disclosure, a non-transitory program storage device can comprise instructions stored thereon to cause one or more processors, devices, systems, etc. to perform the method and steps disclosed herein. In the teachings of the present disclosure, for example, the system 10, host 20, clients 50, and the like can include any one or more suitable processing elements, application-specific integrated circuits, chips, field programmable arrays, etc. and can include any one or more suitable memory or storage elements. As will be appreciated, for example, teachings of the present disclosure can be implemented in digital electronic circuitry, computer hardware, computer firmware, computer software, or any combination thereof. Teachings of the present disclosure can be implemented in a programmable storage device (computer program product tangibly embodied in a machine-readable storage device) for execution by a programmable control device or processor so that the programmable processor executing program instructions can perform functions of the present disclosure. The teachings of the present disclosure can be implemented advantageously in one or more computer programs that are executable on a programmable system including at least one programmable processor coupled to receive data and instructions from, and to transmit data and instructions to, a data storage system, at least one input device, and at least one output device. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of coordinating a live performance given by actors to an audience at a venue, the method comprising:

storing, at a host, a script for the live performance, the script having roles for playing by the actors, the script having teleprompter text for delivery by the actors to the audience at a sequence in the live performance;

associating, at the host, one or more media elements in the sequence of the teleprompter text of the script for output to the audience in the live performance;

associating, at the host, clients at the venue, each of a plurality of the clients configured to execute a client application, the client application having audio-visual control and having pacing control;

delivering, from the host, the teleprompter text to any one or more of first of the clients at the venue, the any one or more first client being configured to output the teleprompter text in real time at the sequence during the live performance;

delivering, from the host, the one or more associated media elements to any one or more of second of the clients at the venue, the any one or more second client being configured to output the one or more associated media elements concurrent to the teleprompter text; and controlling an audio-visual capability and a pace at which the teleprompter text is output to the actors and at which the one or more associated media elements are concurrently output to the audience in real time at the sequence during the live performance by permitting the client application for any one or more of third of the clients at the venue to control the audio-visual capability with the audio-visual control and to control the pace with the pacing control for the client applications of the other clients at the venue.

2. The method of claim 1, wherein storing, at the host, the script for the live performance comprises providing one or more user interfaces at the host to create the script.

3. The method of claim 1, wherein delivering, from the host, the teleprompter text to the any one or more first client comprises delivering the teleprompter text for output at the sequence during the live performance by at least one visual output device at the venue.

4. The method of claim 1, wherein delivering, from the host, the one or more associated media elements to the any one or more second client comprises delivering the one or more associated media elements for output at the sequence during the live performance by one or more media output devices at the venue.

5. The method of claim 1, wherein delivering, from the host, the one or more associated media elements to the any one or more second client comprises delivering the one or more associated media elements for output at the sequence during the live performance by at least one of the any one or more second client having one or more media outputs.

6. The method of claim 5, further comprising outputting the one or more associated media elements in real time at the sequence with the at least one second client; or delivering the one or more associated media elements in real time at the sequence from the at least one second client to one or more media output devices.

7. The method of claim 1, wherein storing the script at the host comprises storing the script with a host application running on a server accessible by the clients via a network interface.

8. The method of claim 1, wherein associating, at the host, the one or more media elements in the sequence of the teleprompter text comprises associating one or more of a song, a karaoke song, music, a video, an image, a sound effect, a smoke effect, and a lighting effect.

9. The method of claim 1, wherein associating, at the host, the clients at the venue comprises assigning the roles using the host; or selecting the roles using the clients.

10. The method of claim 1, wherein associating, at the host, the clients at the venue comprises creating a link for the live performance; and sharing the link for access by the clients.

11. The method of claim 1, wherein delivering, from the host, the teleprompter text comprises sending the teleprompter text from the host to at least one of the any one or more first client; and outputting the teleprompter text with the client application running on the at least first client.

12. The method of claim 1, wherein delivering, from the host, the one or more associated media elements comprises sending the one or more associated media elements from the host to the client application running on at least one of the any one or more second client; and outputting the one or more associated media elements with one or more interfaces of the client application to one or more media output devices at the venue.

13. The method of claim 12, wherein the one or more media output devices comprise one or more of audio equipment, video equipment, one or more displays, one or more projectors, smoke machine, and lighting equipment.

14. The method of claim 12, wherein the any one or more second client comprises one or more of a local server, a computer, a laptop, a tablet computer, a smartphone, and a handheld device.

15. The method of claim 1, wherein delivering, from the host, content of the teleprompter text and/or the one or more associated media elements for output in real time at the sequence during the live performance comprises one or more of:

streaming the content from the host and buffering the content at the associated client for output by the associated client in real time at the venue;

streaming the content from the host and buffering the content at at least one media output device at the venue for output by the at least one media output device in real time at the venue;

downloading the content in whole or in part from the host on the associated client and controlling the output of the content at the pace in real time by the associated client; and downloading the content in whole or in part from the host on at least one media output device at the venue and controlling the output of the content at the pace in real time by the at least one media output device.

16. The method of claim 1, further comprising delivering, from a server of the host, the client applications to client devices for the clients.

17. The method of claim 1, wherein the host comprises a server, a server system, a web-based server, or a remote server; and wherein the clients comprise one or more of a local server, a computer, a laptop, a tablet computer, a smartphone, and a handheld device.

18. The method of claim 1, wherein at least one of the any one or more first client is the same as or different from at least one of the any one or more second client; wherein at least one of the any one or more first client is the same as or different from at least one of the any one or more third client; wherein at least one of the any one or more second client is the same as or different from at least one of the any one or more third client; wherein the any one or more third client having the client application permitted to control the audio-visual capability and the pace is selected from the group consisting of a local user device associated with a director at the venue, a local user device associated with one of the actors at the venue, a computer, a laptop, a portable device, a master device, a director device, a smartphone, a tablet, and a handheld device; or wherein the audio-visual control and the pacing control for the client application is associated with one or more user logons.

19. A method of coordinating live performances given by actors to audiences at venues, the method comprising:

storing, at a host, one or more scripts for the live performances, the one or more scripts having roles for playing by the actors, each of the one or more scripts having teleprompter text for delivery by the actors to the audiences at a sequence in each of the live performances;

associating, at the host, one or more media elements in the sequence of the teleprompter text of the script for output in each of the live performances of each of the one or more scripts;

associating, at the host, clients for each of the one or more scripts in each of the live performances at each of the venues, each of a plurality of the clients configured to execute a client application, the client application having audio-visual control and having pacing control;

delivering, from the host, the teleprompter text to any one or more of first of the clients at each of the venues, the any one or more first client being configured to output the teleprompter text in real time at the sequence during each of the live performances at each of the venues; and delivering, from the host, the one or more associated media elements to any one or more second of the clients at each of the venues, the any one or more second client being configured to output the one or more associated media elements concurrent to the teleprompter text; and controlling an audio-visual capability and a pace at which the teleprompter text is output to the actors and at which the one or more associated media elements are concurrently output to the audiences in real time at the sequence during each of the live performances at each of the venues by permitting the client application for any one or more of third of the clients at the venue to control the audio-visual capability with the audio-visual control and to control the pace with the pacing control for the client applications of the other clients at the venue.

20. The method of claim 19, further comprising associating, at the host, a configuration for media output at each of the venues, wherein delivering, from the host, the one or more associated media elements for output in the sequence during each of the live performances at each of the venues comprise delivering, from the host, the one or more associated media elements according to the associated configuration of the media output at each of the venues.

21. A non-transitory program storage device comprising instructions stored thereon to cause one or more processors of a host to:

store a script for actors to give a live performance to an audience at a venue, the script having roles for playing by the actors at the venue, the script having teleprompter text for delivery by the actors to the audience at a sequence in the live performance at the venue;

associate a plurality of media elements in the sequence of the teleprompter text for output to the audience in the live performance at the venue;

associate a plurality of clients at the venue, each of a plurality of the clients configured to execute a client application, the client application having audio-visual control and having pacing control;

deliver the teleprompter text from the host to any one or more first of the clients at the venue, the any one or more first client being configured to output the teleprompter text in real time at the sequence during the live performance;

deliver the associated media elements from the host to any one or more second of the clients at the venue, the any one or more second client being configured to output the associated media elements concurrent to the teleprompter text; and permit the audio-visual control and the pacing control of the client application for any one or more third of the clients at the venue to control an audio-visual capability and a pace for the client applications of the other clients at the venue at which the teleprompter text is output to the actors and at which the one or more associated media elements are concurrently output to the audience in real time at the sequence during the live performance.

22. A host device for coordinating a live performance given by a plurality of networked client devices and actors to an audience at a venue, the host device comprising:

memory storing a script for the live performance, the script having roles for playing by the actors, the script having teleprompter text for delivery by the actors to the audience at a sequence in the live performance, the script having a plurality of media elements associated in the sequence of the teleprompter text for output to the audience in the live performance;

one or more interfaces for communication with the networked client devices; and one or more processors in communication with the memory and the one or more interfaces and configured to:

associate a plurality of the network client devices at the venue, each of a plurality of the clients configured to execute a client application, the client application having audio-visual control and having pacing control;

deliver the teleprompter text from the host device to at least one first of the network client devices at the venue, the at least one first network client device being configured to output the teleprompter text to the actors in real time at the sequence during the live performance;

deliver the associated media elements from the host device to at least one second of the network client devices at the venue, the at least one second network client device being configured to output the associated media elements concurrent to the teleprompter text; and permit, the audio-visual control and the pacing control of the client application for any one or more third of the network client devices at the venue, to control an audio-visual capability and a pace for the client applications of the other clients at the venue at which the teleprompter text is output to the actors and at which the one or more associated media elements are concurrently output to the audience in real time at the sequence during the live performance.

* * * * *